United States Patent [19]

Dehaene

[11] 4,388,726
[45] Jun. 14, 1983

[54] SYSTEM FOR THE ULTRA-HIGH FREQUENCY TRANSMISSION OF NUMERICAL DATA

[75] Inventor: Jean P. Dehaene, Paris, France

[73] Assignee: Thomson-CSF, Paris, France

[21] Appl. No.: 161,557

[22] Filed: Jun. 20, 1980

[30] Foreign Application Priority Data

Jun. 22, 1979 [FR] France ............................. 79 16058

[51] Int. Cl.³ ........................................... H04B 12/00
[52] U.S. Cl. ....................................... 375/44; 375/25;
  375/39; 375/56; 375/80; 370/22; 364/727
[58] Field of Search ....................... 375/27, 31, 33, 44,
  375/55, 39, 26, 25, 37, 62, 78, 80, 81, 91, 94, 75,
  52, 56, 67; 370/18, 22; 307/232–234, 265, 271,
  231, 510–512; 329/110–113, 107; 322/9;
  332/17; 364/724, 727

[56] References Cited

U.S. PATENT DOCUMENTS

| | | | |
|---|---|---|---|
| 3,470,324 | 9/1969 | Harmuth | 370/22 |
| 3,519,937 | 7/1970 | Hubbard | 375/56 |
| 3,539,925 | 11/1970 | Seidel | 375/52 |
| 3,701,143 | 10/1972 | Nacht | 370/22 |
| 3,984,778 | 10/1976 | Bhopale | 375/81 |

FOREIGN PATENT DOCUMENTS 2351547 12/1977 France ............................. 375/44

OTHER PUBLICATIONS

L'Onde Electrique, vol. 58, No. 1–Jan. 1978, V. Maurel "Exemples de transcodage adapte a la transmission numerique", pp. 50–55.
IEEE Transactions On Aerospace and Electronics, vol. AES-6, No. 4, Jul. 1970–R. A. Gonsalves: "Performance of Manchester coded FSK", pp. 598–599.

Primary Examiner—John W. Caldwell
Assistant Examiner—Donnie L. Crosland
Attorney, Agent, or Firm—Cushman, Darby & Cushman

[57] ABSTRACT

A system for communicating numerical data over an UHF radio channel including a transmitter and receiver. The transmitter includes an UHF oscillator whose frequency is modulated by binary information elements from a coding device. The coding device includes a first coder for providing limited sum coding and a second coder coupled to the first coder for providing Walsh I coding. The excursion of the coded signals modulating the UHF oscillator is selected to obtain a radiating spectrum of the two-phase P.S.K. type with no spectral component at the carrier frequency and having quadrature components resulting from its timing. The receiver includes a coherent-phase demodulator and means for reconstituting a decoded signal for generating carrier and timing signals.

4 Claims, 9 Drawing Figures

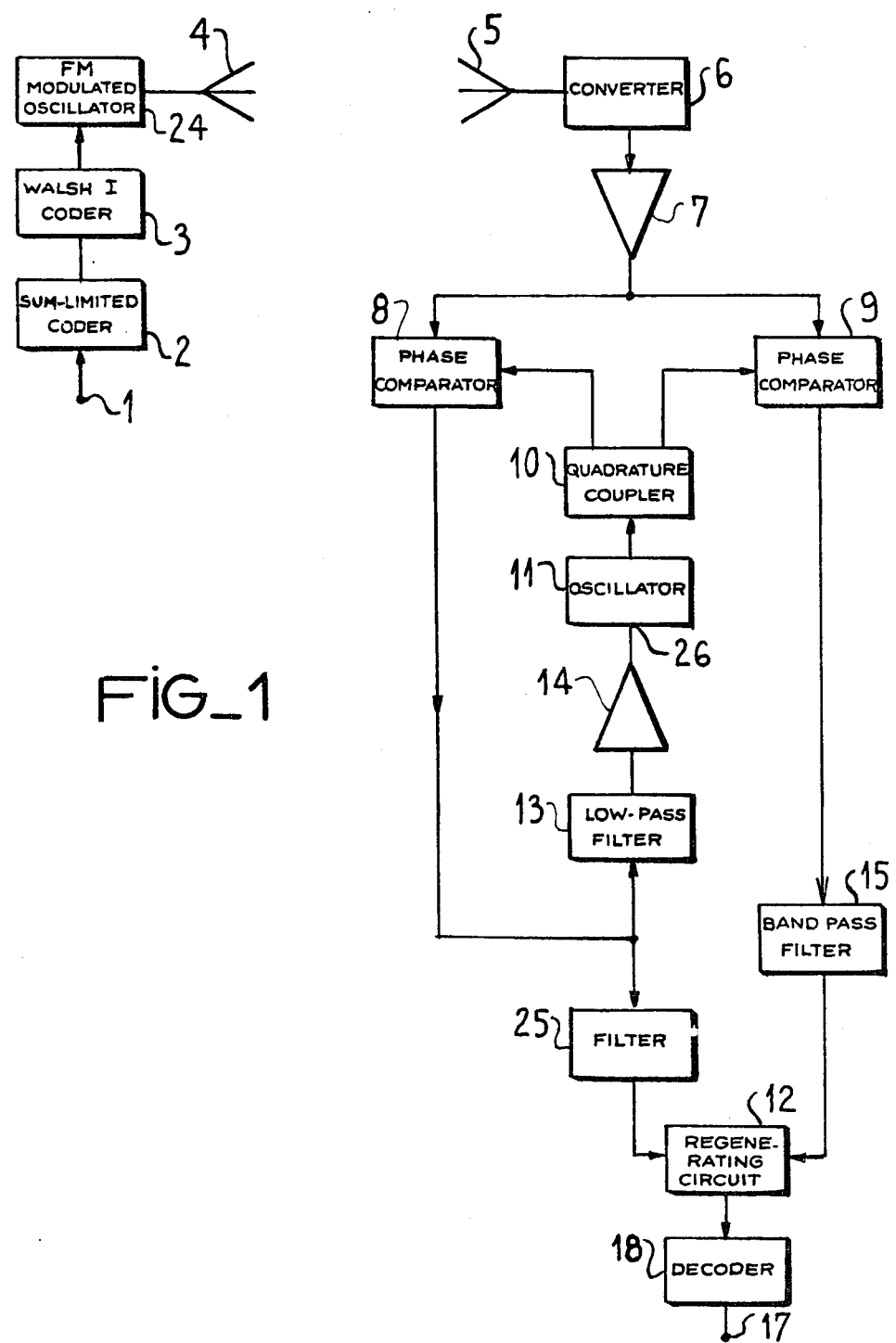
FIG_1

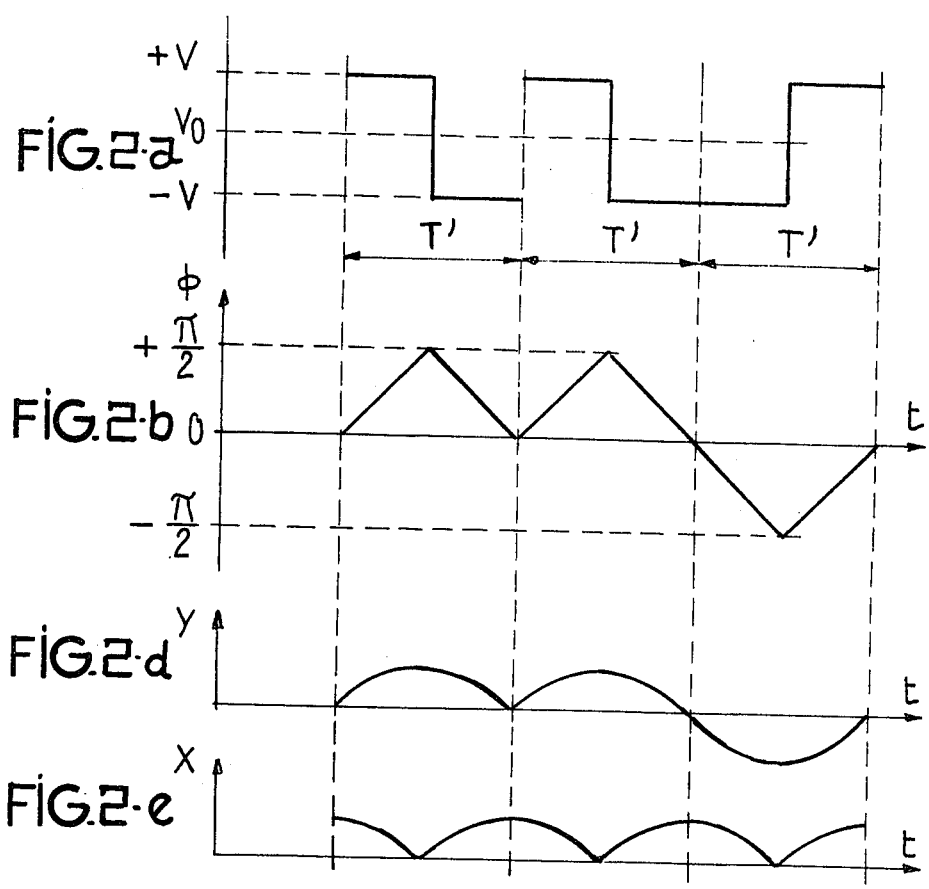

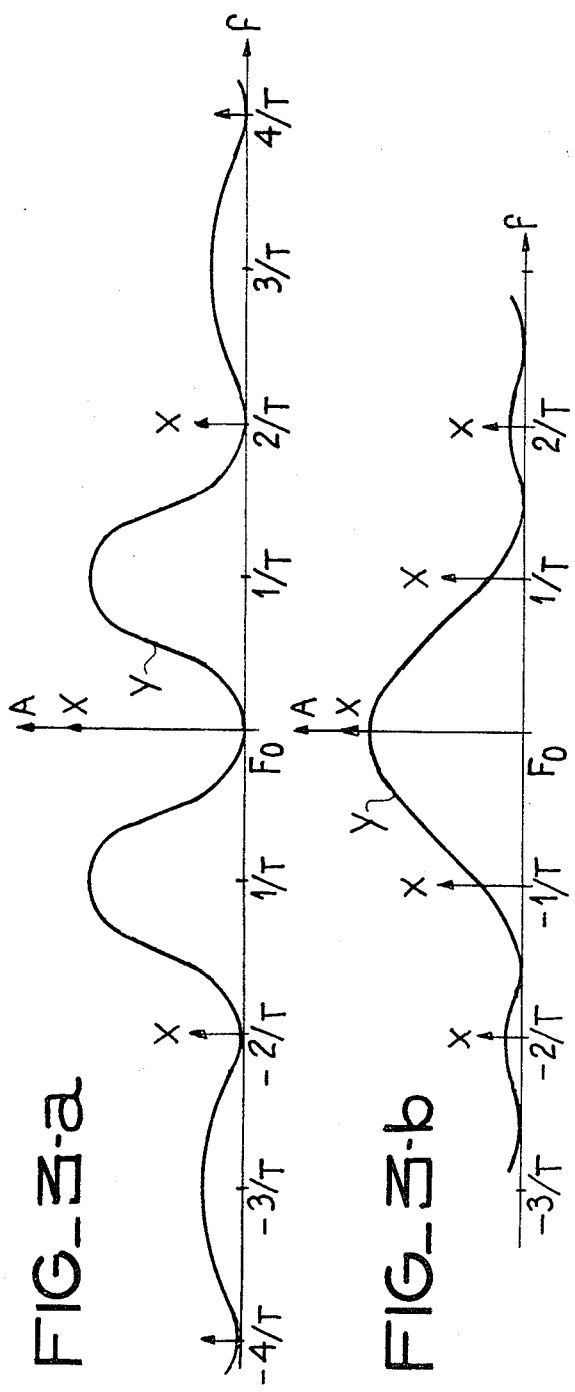
FIG_3-a  FIG_3-b  FIG_3-c

SYSTEM FOR THE ULTRA-HIGH FREQUENCY TRANSMISSION OF NUMERICAL DATA

BACKGROUND OF THE INVENTION

The present invention relates to numerical data transmission systems and more particularly coherent demodulation binary-signal modulators-demodulators for transmission on millimeter waves.

The use of coherent demodulation modulators-demodulators enables the need for frequency stability to be overcome, which is difficult to obtain in millimeter waves, which is required of differential-phase demodulation devices so as to keep, during link-up, an optimum signal-to-noise ratio. But coherent-phase demodulation requires restitution of the carrier at reception.

So as to avoid the cost of generating and transmitting an appropriate signal for this restitution, it is known, at transmission, to frequency modulate an oscillator from data to be transmitted transformed after coding.

A first type of coding uses Walsh I type signal coding (this denomination corresponding to the fact that these signals are identical to the first basic vector of breakdown into Walsh functions).

Thus, from two quadrature components of the modulated signal, it is possible to readily demodulate one of the components carrying the information properly speaking in the form of a phase-jump modulation, the other component carrying the carrier and timing information, which allows after recovery of the carrier coherent demodulation to be achieved.

The disadvantage of this first type of coding associated with frequency modulation comes from the fact that a modulation density appears in the spectrum about the central frequency, which results in the creation of phase variations on the carrier recovered in the receiver by filtering or phase-dependent loop.

A second type of coding uses a Walsh II type signal coding (second basic vector of the break-down into Walsh functions).

This type of coding has the advantage of leading to a frequency modulated signal which comprises a central line free from modulation, but requires a larger frequency band, which is an impediment especially when high flows of information are to be transmitted.

The present invention aims at substantially reducing the disadvantages of these two solutions while keeping their respective advantages to provide coherent modulation of frequency modulated signals, the spectrum of these signals not presenting any modulation density about the carrier frequency, which facilitates the recovery of the carrier in this spectrum and, at the same time, the width of the effective band of the spectrum remaining fairly wide, which is important especially for high information flows.

SUMMARY OF THE INVENTION

In accordance with the invention, a system for the ultra-high frequency transmission of numerical data formed from a transmitter and an associated receiver, the transmitter comprising a coding device having an input receiving the numerical data at timing 1/T and a coded-signal output and a free ultra-high frequency oscillator having a frequency-modulation input connected to the output of the coding device, for delivering directly the modulated signal to be transmitted, the receiver comprising input stages in series, a coherent phase demodulator and a decoding device, is characterized in that the coding device comprises in series a first coder coding in blocks of n symbols the succession of numerical data of period T into blocks of N symbols of period $T' < T$ having two states, n and N being whole numbers and $N > n$, each block of N symbols being sum limited, and a second coder providing Walsh I type coding of the succession of symbols supplied by the first coder, in that the demodulator restitutes the succession of binary elements of period T', and in that the decoding device comprises a decoder effecting the inverse operation of that effected by the first coder.

DESCRIPTION OF THE FIGURES

The invention will be better understood and other characteristics will appear from the following description and the drawings which refer thereto in which:

FIG. 1 is a diagram of an example of a transmission system in accordance with the invention;

FIGS. 2a, 2b, 2c, 2d and 2e and 3a, 3b and 3c show explanatory diagrams.

DESCRIPTION OF THE PREFERRED EMBODIMENTS

The transmission system of the invention is such that the numerical data to be transmitted are transmitted to a transmitter which codes them according to a limited-sum coding the property of which is to suppress the modulation about the lines of the timing spectrum then to effect coding Walsh functions of Walsh I type. This latter coding, which transforms the rectangular signal into arcs of sine waves, does not modify the characteristic obtained by the first coding, i.e., the absence of energy due to the modulation properly speaking about the lines of the timing spectrum.

In FIG. 1, digital information applied to input terminal 1 is transformed into blocks of symbols having two states, each block being sum-limited in a coder 2 then coded into Walsh I type signals in a coder 3, before frequency modulating an oscillator 24, freely oscillating within a range of millimeter waves and feeding a transmitting aerial 4. The signals picked up by a receiving aerial 5 are converted into an intermediate-frequency spectrum by a converter 6 formed from a mixer fed by a free local oscillator. The intermediate-frequency signals, after amplification in an amplifier 7, feed a demodulator which comprises two phase comparators 8 and 9 each receiving at one of their two inputs the intermediate-frequency modulated carrier and at their other input the signals delivered respectively by the two outputs of a quadrature coupler 10 fed by a slaved oscillator 11. The output of comparator 8 is connected to the input of a signal filter 25 and to the frequency-control input 26 of oscillator 11 through a low-pass filter 13 followed by an amplifier 14 setting the transfer function of the phase-dependent loop. A regenerating circuit 12 has one input connected to the output of the signal filter 25 and a second input connected to the output of comparator 9 through a pass-band filter 15. The output of this regenerator 12 is connected to the output 17 of the receiver through a decoder 18, corresponding to the inverse function of coder 2.

Coder 2 (FIG. 1) effects a sum-limited binary coding of the numerical information to be transmitted, i.e. it causes a number $N > n$ to correspond to n bits of information; it then introduces a redundancy the purpose of which is to maintain limited, at all times, the sum of all the binary elements transmitted.

The result is thus a zero spectral density at the carrier frequency and at frequencies $F_o \pm (k/T')$ where k is any whole number and T' the new period of the train of binary elements which is by definition less than T, and dependent on the ratio n/N.

In the example described, n=3 and N=4 from which 1/T'=4/3T.

The operation will be described with reference to FIGS. 2a, 2b, 2c, 2d and 2e.

In these figures, curve 2a shows a succession of three binary elements supplied by coder 3, in correspondence with respective logic signals "1", "1" and "0" supplied by coder 2.

These elements have a duration T' during which they each assume successively two logic values "+1" and "−1" to which correspond respectively symmetric modulation voltages +V and −V of a voltage $V_o$ determining the rest frequency $F_o$ of oscillator 3. To +V there corresponds a frequency $F_o + \Delta F$ and to −V, $F_o - \Delta F$. Each element corresponding to a signal "1" assumes the value +V from 0 to T'/2 and −V from T'/2 to T', these values are inverted for a signal "0". FIG. 2a shows then the succession 110.

These signals are identical to the first basic vector of the breakdown into Walsh functions, generally called Walsh I. $\Delta F$, and so V, are selected so that at the end of a period of time T'/2 during which the binary element presents the same value, the phase variation in relation to the non-modulated signal gives a phase jump of $\pi/2$.

Curve 2b shows the corresponding phase variation of the carrier signal modulated by these binary elements, 110.

FIG. 3c illustrates the spectrum obtained under these conditions. FIGS. 3a and 3b show the spectrum obtained by frequency modulation associated respectively with Walsh II type coding and Walsh I type coding.

FIG. 3a shows then the amplitude A of the spectrum thus obtained for symbols of a duration T and a carrier frequency of the oscillator equal to $F_o$. Curve Y show the modulated useful part of the signal and X discrete lines spaced apart by 2/T. The two parts of the spectrum are very distinct and it is easy to extract, on the one hand, biphase-type modulation signals in the form of sine wave signals instead of the usual rectangular modulation signals and, on the other hand, a periodic carrier signal having a basic period half that of the timing. But as indicated above, these arrangements have the disadvantage of generating a fairly wide spectrum, having a high-frequency Nyquist band whose width is substantially equal to 3/T; furthermore, the recoverable timing line is in fact at a frequency double the timing frequency, and it is necessary to remove the ambiguity introduced by dividing by 2.

For the same duration T of the symbols the spectrum of a signal obtained by Walsh I type coding and frequency modulation is shown in FIG. 3b with the same notations. The energy in the modulation spectrum is contained essentially in a bandwidth equal to 1/T, so approximately 3 times narrower than previously for transmitting the same amount of information. A line is also obtained at the carrier frequency as well as lines at the timing frequency; but as indicated above, their recovery is made delicate because of the energy density due to the modulation properly speaking about these lines.

By comparing the spectrum of FIG. 3c with that shown in FIG. 3b, already mentioned, isolation of the carrier lines is noted with respect to the modulation, comparable to what is obtained with the spectrum resulting from Walsh II type signals (FIG. 3a already mentioned) but also the advantage of an effective bandwidth of the spectrum (1st lobe) which is twice as small and which is only increased by ⅓ with respect to that obtained with non-sum-limited Walsh I type signals, the flow of information transmitted being multiplied by 4/3.

This more concentrated form of spectrum also has the advantage of reducing the risks of disturbance between neighboring spectra.

The restitution of the data at reception is obtained simply in accordance with the process for coherent demodulation of a signal formed from two quadrature carriers one of which contains the timing information and the other the information properly speaking which is differentiated from the usual binary signals by the fact that the demodulator restores sine-wave binary signals from rectangular modulation signals; it is in fact the characteristic of this frequency modulation by Walsh I signals to enable this filtering function to be achieved which results in causing a sine-wave arc to correspond to each rectangular binary signal.

This is illustrated in FIGS. 2c to 2e.

FIG. 2c is the trigonometrical representation of curve 2b, previously described, in the form of a point M traveling at a constant speed from $-\pi/2$ to $+\pi/2$ over a trigonometrical circle C with coordinate axes OX and OY; the projections of point M on these same axes give rise respectively to the curves of FIGS. 2d and 2e.

The biphase information signal of curve 2d is obtained, from the circuit of FIG. 1, at the output of comparator 8, this comparator is such that it supplies a zero voltage when the signals which are applied thereto are in phase quadrature; the slaving of oscillator 11 maintains at zero the average value of this output signal of comparator 8 filtered by the low-pass filter 13.

The conversion of the biphase signals into conventional binary elements is provided by the regeneration circuit 12 from the signal shown in FIG. 2e obtained at the output of comparator 9, similar to comparator 8, but fed in phase quadrature with respect to this latter by the second output of coupler 10.

This signal 2e, identical whatever the sign of the modulating binary element, has a non-zero average value, characteristic of the level received by the receiver and which may then serve for providing automatic control of its gain. It also has a line at the timing frequency thus allowing regeneration.

Finally the initial numerical data are restored by means of decoder 18 which effects the inverse operation to that effected by the limited-sum coder 2.

What is claimed is:

1. A system for communicating data over a radio channel comprising:
   a transmitter including:
   a coding device adapted to receive the data transmitted at a timing 1/T and providing a coded-signal output, the coding device including a first coder for coding blocks of n successive symbols of data of period T into blocks of N symbols of period T' < T and having two (2) states, n and N being whole numbers and N > n, each block of N symbols being sum-limited, and a second coder connected to the first coder and providing a Walsh I coding of the sum-limited symbols from the first coder, and
   a frequency modulating oscillator for generating a signal modulated with the coded signal provided by said coding device, and a receiver including:
  means for receiving the modulated signal transmitted by the transmitter,
  a coherent-phase demodulator, coupled to the receiving means, for restoring the succession of binary elements of period T', and
  a decoding device, coupled to the coherent phase demodulator, including a decoder providing a decoding function inverse of that provided by the first coder of said transmitter.

2. The transmission system as claimed in claim 1, wherein the limited-sum coding is of type nT corresponding to NT', with $N = n+1$.

3. A system according to claim 1 wherein the demodulator comprises:
  a generating device having two (2) phase quadrature signal outputs;
  first and second phase comparators, each having first and second inputs and an output, the first inputs of both comparators being coupled to one another and forming an input of the demodulator, the second inputs of the comparators being respectively coupled to the two (2) phase quadrature signal outputs of the generating device, the outputs of the comparators providing respectively a biphase signals representative of the transmitted and received coded signals of period T' and a carrier signal having a frequency defined by $1/T'$.

4. A system according to claim 1 wherein the demodulator comprises:
  first and second phase comparators, each having a first input coupled to the output of the receiving means, a second input and an output;
  a filter having an input coupled to the output of the first phase comparator;
  an amplifier coupled to the output of the filter;
  a frequency controllable oscillator having a frequency control input coupled to the output of the amplifier;
  a quadrature coupler having an input coupled to the output of the oscillator and first and second outputs coupled respectively to the search inputs of the first and second phase comparators for providing a biphase signal thereto.

* * * * *